(12) United States Patent
Le Docte

(10) Patent No.: US 8,793,970 B2
(45) Date of Patent: Aug. 5, 2014

(54) PIEZOELECTRIC DE-ICING OF AN AIR INLET

(75) Inventor: Thierry Le Docte, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 1112 days.

(21) Appl. No.: 12/738,960

(22) PCT Filed: Sep. 29, 2008

(86) PCT No.: PCT/FR2008/001353
§ 371 (c)(1),
(2), (4) Date: Sep. 30, 2010

(87) PCT Pub. No.: WO2009/077666
PCT Pub. Date: Jun. 25, 2009

(65) Prior Publication Data
US 2011/0011056 A1    Jan. 20, 2011

(30) Foreign Application Priority Data

Oct. 22, 2007  (FR) ..................................... 07 07380

(51) Int. Cl.
*F02G 3/00* (2006.01)

(52) U.S. Cl.
USPC ...................................................... 60/39.093

(58) Field of Classification Search
CPC ..................... B64D 15/163; B64D 2033/0233; B64D 33/02
USPC ......................... 60/39.093; 244/134 D, 134 R
See application file for complete search history.

(56) References Cited

U.S. PATENT DOCUMENTS

| | | | | |
|---|---|---|---|---|
| 3,549,964 | A | * | 12/1970 | Afanasov et al. ......... 244/134 C |
| 4,545,553 | A | * | 10/1985 | Finke et al. ............... 244/134 D |
| 4,732,351 | A | | 3/1988 | Bird |
| 4,775,118 | A | * | 10/1988 | Daniels .................... 244/134 D |
| 5,074,497 | A | * | 12/1991 | Phillips, II ............... 244/134 D |
| 5,129,598 | A | * | 7/1992 | Adams et al. ............. 244/134 D |
| 5,172,024 | A | | 12/1992 | Broussoux |
| 5,206,806 | A | * | 4/1993 | Gerardi et al. ................ 340/582 |
| 5,562,265 | A | * | 10/1996 | Rauckhorst, III ......... 244/134 R |
| 5,609,314 | A | * | 3/1997 | Rauckhorst et al. ...... 244/134 A |
| 5,686,003 | A | * | 11/1997 | Ingram et al. ................ 219/201 |
| 5,845,878 | A | * | 12/1998 | Rauckhorst et al. ...... 244/134 A |
| 6,102,333 | A | * | 8/2000 | Gerardi et al. ............ 244/134 R |
| 8,146,866 | B2 | * | 4/2012 | Tenebre et al. ........... 244/134 R |
| 8,540,185 | B2 | * | 9/2013 | Vauchel et al. ............. 244/53 B |

FOREIGN PATENT DOCUMENTS

| | | |
|---|---|---|
| DE | 102004060675 A1 | 6/2006 |
| EP | 0384597 | 8/1990 |
| EP | 1495963 A2 | 1/2005 |
| EP | 1734090 | 12/2006 |
| GB | 2106966 | 4/1983 |
| WO | 02090459 | 11/2002 |

OTHER PUBLICATIONS

International Search Report PCT/FR2008/001353; Dated Jul. 2, 2009.

* cited by examiner

*Primary Examiner* — Phutthiwat Wongwian
(74) *Attorney, Agent, or Firm* — Brinks Gilson & Lione

(57) ABSTRACT

A lip assembly for an air inlet of a turbojet engine nacelle includes an inner surface, an external surface. A portion of the external surface is covered by an ice-repellent coating. In particular, the ice-repellent coating includes a piezoelectric actuator which vibrates the external surface and is combined into a matrix of the ice-repellent coating.

7 Claims, 2 Drawing Sheets

PIEZOELECTRIC DE-ICING OF AN AIR INLET

TECHNICAL FIELD

The present invention relates in particular to a turbojet engine nacelle air-inlet lip assembly.

BACKGROUND

An airplane is propelled by one or more power plants each comprising a turbojet engine housed in a tubular nacelle. Each power plant is attached to the airplane by a pylon generally situated under a wing or at the fuselage.

A nacelle generally has a structure comprising an air inlet upstream of the engine, a central section intended to surround a fan of the turbojet engine, a downstream section housing thrust reversal means and intended to surround the combustion chamber of the turbojet engine, and generally ends in a jet pipe nozzle the outlet of which is situated downstream of the turbojet engine.

The air inlet comprises, on the one hand, an inlet lip designed to optimally funnel toward the turbojet engine the air needed to supply the fan and the internal compressors of the turbojet engine and, on the other hand, a downstream structure to which the lip is attached and which is intended to suitably channel the air toward the blades of the fan. The assembly is attached upstream of a casing of the fan belonging to the upstream section of the nacelle.

In flight, depending on the temperature and moisture conditions, ice may form on the nacelle at the external surface of the air-inlet lip. The presence of ice or frost alters the aerodynamic properties of the air inlet and disrupts the flow of air to the fan.

One solution for defrosting or de-icing the external surface is to prevent ice from forming on this external surface.

Thus, it is known practice to bleed hot air from the turbojet engine compressor and convey it to the air-inlet lip in order to heat the walls. However, such a device entails a system of pipes for carrying the hot air between the turbojet engine and the air inlet, and a system of removing the hot air from the air-inlet lip. This increases the mass of the power plant, and this is not desirable.

Patent EP 1 495 963 proposes applying a resistive heating element to an exterior wall of the air-inlet lip. This technology entails the addition of anti-erosion protection over the top of the de-icing resistive heating element.

A solution such as this has a number of disadvantages. First, the anti-erosion product is ill-suited to the surface finish required of the external wall of the lip. Next, if the air-inlet lip is partially covered, it exhibits a discontinuity which is detrimental to the aerodynamic lines of the air inlet. Finally, such a system contributes to increasing the total thickness of the lip, and this may lead to a downturn in acoustic attenuation performance, this being associated with the thickness of the air-inlet lip.

Also known is a structure for a turbojet engine nacelle air-inlet lip comprising an external skin and an internal skin between which there is an electrical heating element.

A disadvantage of this structure is that the electrical heating element has to be constantly electrically powered to prevent ice from forming on the structure. The disclosure provides a turbojet engine nacelle air-inlet lip assembly that offers effective de-icing and effective defrosting without the risk of damaging the turbojet engine, without increasing the mass of the nacelle, without disrupting the aerodynamic lines or the acoustic attenuation, and which does not require a permanent supply of electrical power.

BRIEF SUMMARY

An air-inlet lip assembly of a turbojet engine nacelle is provided comprising an internal surface, an external surface and de-icing means, characterized in that the de-icing means comprise an ice-repellent coating covering at least part of the external surface.

What is meant here by "external surface" is the surface exposed to the formation of atmospheric ice.

What is meant here by "internal surface" is the surface exposed to the formation of atmospheric ice.

The ice-repellent coating, also sometimes known as a "icephobic coating" is intended to prevent the formation of the layer of ice or to improve the shedding of ice once the layer of ice has formed.

Thus, the ice-repellent coating is able to limit the thickness of ice that becomes attached to this external surface to a thickness that does not exceed 2 mm.

At the same time, the ice-repellent coating has weak interactions with the ice which means that the energy required to break up the layer of ice that has formed is lower than is usually required when the ice directly covers the external surface. Thus, the action of the wind generated by or experienced by the airplane in flight is enough to remove the layer of atmospheric ice.

The lip assembly according to the invention greatly limits the formation of ice and only a thin layer that is easy to eliminate has sometimes to be removed.

Furthermore, because the layer of atmospheric ice is thin, the ice is detached from the external surface in the form of small pieces of the order of 2 mm thick which present no danger to the turbojet engine.

Advantageously, the lip assembly according to the invention is not encumbered by the presence of the ice repellent coating on the external surface.

Beneficially, the aerodynamic lines and the acoustic attenuation of the lip assembly according to the invention are not disturbed by the presence of the ice repellent coating because this coating follows the aerodynamic lines of the external surface of the lip assembly according to the invention.

Notably, de-icing is performed advantageously without requiring a permanent supply of electrical power.

According to other features of the invention, the structure of the invention has one or more of the following optional features considered alone or in any possible combination:

- the de-icing means further comprise lightweight vibration means able to cause the external surface to vibrate, notably piezoelectric actuating means advantageously allowing the ice to be broken up and removed very effectively without substantially adding to the mass of the turbojet engine nacelle;
- the piezoelectric actuating means comprise at least one piezoelectric actuator and electrical power supply means, allowing the ice deposited in a thin layer to be broken up into pieces equivalent to hail stones a few millimeters in diameter, not liable to damage the turbojet engine, without having to resort to a permanent supply of electrical power;
- the ice repellent coating also comprises one or more piezoelectric actuators allowing easy operation of the lip assembly according to the invention;
- at least one piezoelectric actuator, notably comprising a cylinder and a dipole, is in contact with the internal surface, allowing the vibrations applied to a zone of the external surface to be fine-tuned;

the ice-repellent coating is chosen from paints containing polyurethane or fluoro polyurethane, resins such as resins containing polydimethylsiloxane or plastics containing Teflon®, inducing a weak force of attachment to the layer of atmospheric ice;

the thickness of the ice-repellent coating is between 20 μm and 100 μm, providing a compromise between the durability of the layer of ice repellent coating on the external surface, the weight added by this layer and the cost;

at least part of the lip assembly is made of a material containing a composite or a metal and nanoparticles able to make the surface of the lip assembly ice repellent, namely preventing or very greatly limiting the formation of a layer of ice on this surface.

A turbojet engine nacelle is further provided comprising a lip assembly according to the invention.

BRIEF DESCRIPTION OF THE DRAWINGS

The invention will be better understood from reading the nonlimiting description which follows, given with reference to the attached figures.

DETAILED DESCRIPTION

Figure 1:
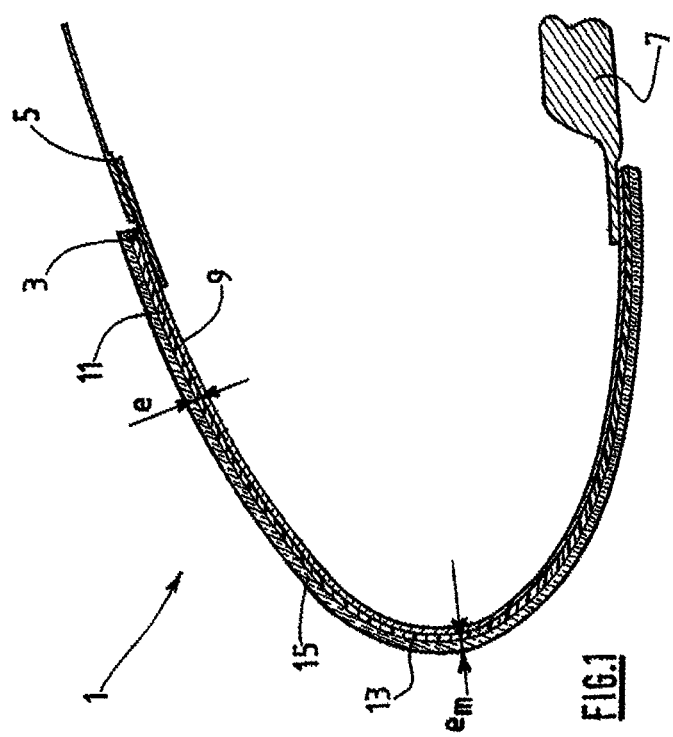
FIG. 1 is a diagram depicting one embodiment of a lip assembly according to the invention.

FIG. 1 depicts a lip assembly 1 according to the invention for a turbojet engine nacelle, not depicted.

The lip assembly 1 according to the invention comprises a wall 3 fixed to the walls 5 and 7 of a downstream structure of the turbojet engine nacelle by any means known to those skilled in the art. The downstream structure is intended to appropriately channel the air toward the blades, not depicted, of the fan.

The wall 3 comprises an internal surface 9 and an external surface 11.

The lip assembly 1 according to the invention comprises de-icing means comprising an ice repellent coating 13 coating at least part of the external surface 11, notably the entirety of this surface 11, as depicted in FIG. 1.

The thickness e of the ice repellent coating 13 is notably less than 500 μm, preferably between 20 μm and 100 μm, notably between 40 μm and 80 μm or even between 50 μm and 70 μm.

The thickness e of the ice repellent coating 13 is notably uniform over the external surface 11.

Such a thickness advantageously permits a compromise between the durability of the layer of ice repellent coating 13 in the face of atmospheric attack, the additional weight caused by the presence of this layer and the cost of this layer.

As indicated above, when the airplane is in flight, the air inlet is sometimes subjected to temperatures and to moisture which are such that a layer of atmospheric ice 15 forms on the external surface 11.

The ice repellent coating 13 advantageously makes it possible to reduce the force of attachment between the atmospheric ice and the external surface 11 without requiring a permanent supply of electrical power.

As a result, when atmospheric ice forms on the external surface 11 of the lip assembly according to the invention, the atmospheric ice builds up on the external surface 11 into a thin layer 15 the maximum thickness $e_m$ of which does not exceed 2 mm.

The lip assembly 1 according to the invention has the advantage of significantly reducing the maximum thickness $e_m$ of the layer of atmospheric ice 15, allowing this layer 15 to be broken up more easily and thus better removed without adding mass to the air inlet when the airplane is in flight.

Specifically, the wind that results from operating the airplane is enough to detach the layer of atmospheric ice 15 and remove it in the form of small pieces of a thickness equal to that of the layer 15, which present no risk of damaging the turbojet engine.

According to one embodiment, the ice repellent coating 13 is incorporated into a matrix intended to coat the external surface 11, thus forming a protective layer.

The matrix is, for example, paint or a resin. By way of example, mention may be made of epoxy. The protective layer may also contain compounds other than the ice repellent coating 13, such as carbon, glass or any other material intended to strengthen the ice repellent coating 13 against wear or impact.

The ice repellent coating 13 is chosen so that it prevents and/or limits the appearance of a layer of atmospheric ice on exposed structures.

Thus, by way of an example of an ice repellent coating 13, mention may be made of paints such as V-102e® (vinyl resin containing powdered aluminum, diisodecyl phthalate, methyl isobutyl ketone, toluene), V-103c® (vinyl resin containing carbon black, diisodecyl phthalate, methyl isobutyl ketone, toluene), V-766$^e$® (vinyl resin containing titanium dioxide and carbon black, diisodecyl phthalate, methyl isobutyl ketone, toluene, orthophosphoric acid), MIL-P-24441C® (resin containing an epoxy polyamide), BMS 10-60® (resin containing polyurethane), Envelon® (resin based on an ethylene-acrylic acid copolymer), Inerta160® (Trimethylhexamethylenediamine epoxy), InterluxBrightside® (resin containing polyurethane), Kiss-Cote® (containing silicone, notably polydimethylsiloxane), PSX-700® (containing siloxane and a polyurethane epoxy), SA-RIP-4004® (modified saturated polyester resin), Slip Plate #1® (resin containing graphite in a mixture of mineral alcohol), Troyguard® (suspension of fluoropolymer in a mixture of mineral alcohol with acrylic urethane), Troyguard/BMS 10-60® (suspension of fluoropolymer in a mixture of mineral alcohol with polyurethane), Wearlon® (containing a methyl silicone epoxy copolymer), WC-1-ICE® (resin containing a saturated polyester in a fluoropolyol).

For preference, the ice repellent coating 13 is chosen from plastics containing Teflon® or fluoro polyurethane resins.

The ice repellent coating 13 preferably induces a particularly weak force of attachment between the layer of ice 15 and the external surface 11 and is therefore particularly effective at limiting the thickness of the layer of ice 15 and making it easier to remove.

According to one preferred embodiment, the de-icing means also comprise lightweight vibration means able to cause the external surface 11 to vibrate, preferably piezoelectric actuating means.

The use of vibrations on the lip assembly 1 according to the invention allows a layer of ice 15 that has formed on the external surface 11 to be broken up and removed. Advantageously, the vibrations used in the context of the invention are not enough to damage the ice repellent coating 13.

Thus, the joint use of an ice repellent coating 13 and of vibration means allows the removal of atmospheric ice to be optimized.

In addition, the lightweight vibration means do not substantially increase of weight of the lip assembly 1 according to the invention.

Advantageously, the application of vibrations to the external surface 11 by the piezoelectric actuating means breaks up the layer of ice 15 into pieces of a diameter ranging between 0.5 mm and 1 cm corresponding to small hail stones not likely to damage the turbojet engine.

Thus, the removal of ice by the combined use of the ice repellent coating 13 and of piezoelectric actuating means is less damaging to the turbojet engine than the de-icing systems currently known.

For preference, the piezoelectric actuating means comprise at least one piezoelectric actuator and electrical power supply means.

The piezoelectric actuator or actuators used in the context of the present invention do not have to operate continuously, but are used as required.

According to a preferred embodiment depicted in FIG. 1, the ice repellent coating 13 also comprises one or more piezoelectric actuator or actuators. The piezoelectric actuator or actuators is or are notably uniformly distributed throughout the matrix of the ice repellent coating 13.

The piezoelectric actuator or actuators are notably connected to a source of electrical power, not depicted, via contact with the wall 3.

According to one embodiment, the piezoelectric actuator or actuators is or are combined into the matrix of the ice repellent coating 13. The presence of the piezoelectric actuator or actuators in the ice repellent coating 13 makes the invention easier to implement.

By way of example, mention may be made of paints containing lead zirconate titanate (PZT), gels or a composite lip structure that confers piezoelectric properties upon the lip.

According to one preferred embodiment, at least part of the lip assembly (1) according to the invention is made of a material containing a composite or a metal and nanoparticles able to make the surface of the lip assembly ice repellent, namely preventing or very greatly limiting the formation of a layer of ice on this surface.

Figure 2:
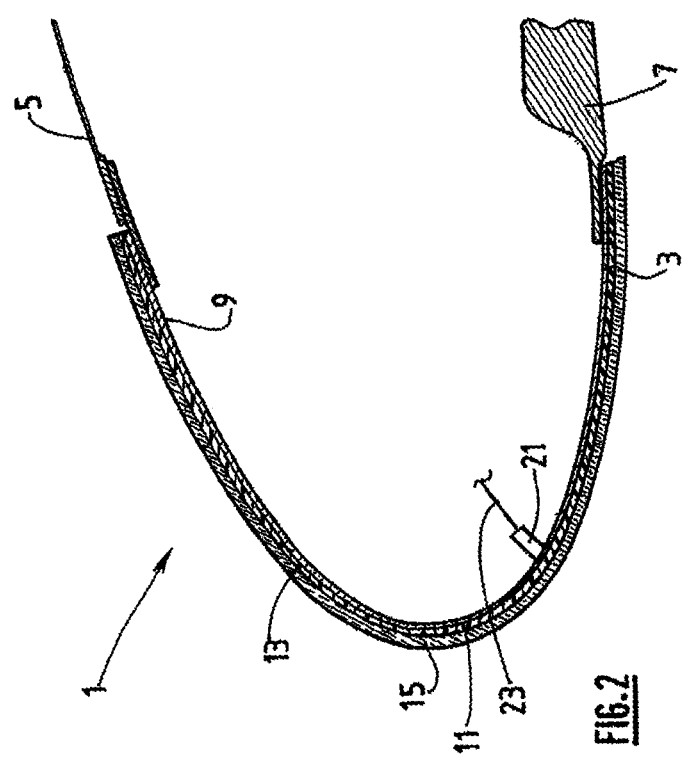
FIG. 2 is a diagram depicting another embodiment of a lip assembly according to the invention.

According to another embodiment depicted in FIG. 2, at least one piezoelectric actuator 21 is in contact with the internal surface 9, of the lip assembly according to the invention.

The number of piezoelectric actuators to be placed in contact depends on the ability of the actuator to vibrate the external surface 11.

When several piezoelectric actuators are in contact with the internal surface 9, these actuators are, according to one particular embodiment, uniformly distributed.

According to another embodiment depicted in FIG. 2, just one piezoelectric actuator 21 is in contact with the internal surface 9, making it possible to reduce the bulk on the internal surface 9.

For preference, the piezoelectric actuator or actuators 21 comprises or comprise a cylinder and a dipole.

The piezoelectric actuator or actuators 21 are connected individually by electrical power supply means, notably by an electric cable 23, to a source of electrical power, not depicted.

Thus it can be seen from the two nonlimiting examples that the vibration means do not generate any discontinuity in the aerodynamics of the air-inlet lip.

Were this not the case, this type of discontinuity would contribute to a reduction in the acoustic attenuation performance and to an increase in fuel consumption.

The invention claimed is:

1. An air-inlet lip assembly of a turbojet engine nacelle comprising
    an internal surface,
    an external surface and
    de-icing means,
    wherein the de-icing means comprise an ice-repellent coating covering at least part of the external surface, said ice-repellent coating comprising at least one piezoelectric actuator in a matrix of said ice-repellent coating to cause the external surface to vibrate, the at least one piezoelectric actuator being combined into said matrix of said ice-repellent coating,
    wherein a thickness of the ice-repellent coating is between 20 µm and 100 µm.

2. The air-inlet lip assembly as claimed in claim 1, wherein the at least one piezoelectric actuator comprises an electrical power supplier.

3. The air-inlet lip assembly as claimed in claim 1, wherein the at least one piezoelectric actuator is in contact with the internal surface.

4. The air-inlet lip assembly as claimed in claim 1, wherein the ice-repellent coating is selected from polyurethane paints, fluoro polyurethane paints, resins, or plastics containing TEFLON.

5. The air-inlet lip assembly as claimed in claim 1, wherein at least part of the lip assembly is made of a material containing at least one of a composite, a metal and nanoparticles able to make a surface of the lip assembly ice repellent.

6. A turbojet engine nacelle comprising a lip assembly as claimed in claim 1.

7. The air-inlet lip assembly as claimed in claim 1, wherein the ice-repellent coating comprises resins containing polydimethylsiloxane.

* * * * *